(12) United States Patent
Mohamed et al.

(10) Patent No.: US 6,301,653 B1
(45) Date of Patent: Oct. 9, 2001

(54) PROCESSOR CONTAINING DATA PATH UNITS WITH FORWARDING PATHS BETWEEN TWO DATA PATH UNITS AND A UNIQUE CONFIGURATION OR REGISTER BLOCKS

(75) Inventors: Moataz A. Mohamed, Irvine; John R. Spence, Villa Park; Kenneth W. Malich, Norco, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/173,257

(22) Filed: Oct. 14, 1998

(51) Int. Cl.[7] .................................................. G06F 9/34
(52) U.S. Cl. .............................................. 712/214; 712/24
(58) Field of Search .................................... 712/24, 214

(56) References Cited

U.S. PATENT DOCUMENTS

| 5,053,986 | * | 10/1991 | Ahsan et al. ........................... 708/520 |
| 5,121,502 | | 6/1992 | Rau et al. ................................ 712/24 |
| 5,301,340 | | 4/1994 | Cook ....................................... 712/24 |
| 5,333,280 | | 7/1994 | Ishikawa et al. ...................... 712/241 |
| 5,337,411 | * | 8/1994 | Harrison, Jr. .......................... 709/253 |
| 5,513,363 | | 4/1996 | Kumar et al. ............................ 712/1 |
| 5,530,817 | | 6/1996 | Masubuchi ........................... 395/375 |
| 5,625,835 | | 4/1997 | Ebcioglu et al. ....................... 712/23 |
| 5,644,780 | | 7/1997 | Luick ..................................... 712/23 |
| 5,649,229 | | 7/1997 | Matsuzaki et al. ..................... 712/24 |
| 5,799,163 | * | 8/1998 | Park et al. ............................ 712/205 |
| 5,826,096 | * | 10/1998 | Baxter ..................................... 712/24 |
| 5,923,339 | * | 7/1999 | Data et al. ............................ 345/505 |
| 5,968,160 | * | 10/1999 | Saito et al. ............................. 712/14 |
| 6,026,478 | * | 2/2000 | Dowling ................................. 712/24 |

FOREIGN PATENT DOCUMENTS

| 0 171 595 A2 | 2/1986 | (EP) . |
| 0 291 613 A1 | 11/1988 | (EP) . |
| 0 588 341 A2 | 3/1994 | (EP) . |
| 0 588 341 A3 | 10/1995 | (EP) . |

OTHER PUBLICATIONS

Weddell, Steve *VLIW&TI's New C6x DSP–A Quantum Leap In Performance*, Avnet Design Apr. 1998.

* cited by examiner

Primary Examiner—Kenneth S. Kim
(74) Attorney, Agent, or Firm—Snell & Wilmer LLP

(57) ABSTRACT

The present invention provides an efficient method of forwarding and sharing information between functional units and register files in an effort to execute instructions. A digital signal processor includes a plurality of register blocks for storing data operands coupled to a plurality of data path units for executing instructions. Preferably, each register block is coupled to at least two data path units. In addition, the processor preferably has a plurality of forwarding paths which forward information from one data path unit to another. A scheduler efficiently forwards instructions to data path units based on information regarding the configuration of the processor and any restrictions which might be imposed on the scheduler.

28 Claims, 5 Drawing Sheets

400

| SRC \ DST | M01Rd (32) | | A01Rd (32) | | LSRd (32) | | LSb (32) | | M0Rd (16) | | M1Rd (16) | | A0Rd (16) | | A1Rd (16) | | LSRd (16) | | # OF SOURCES (INCL RF) | # OF COMPARATORS |
|---|---|---|---|---|---|---|---|---|---|---|---|---|---|---|---|---|---|---|---|---|
| | L | S | L | S | L | S | L | S | L | S | L | S | L | S | L | S | L | S | | |
| M01Ra (32) 11 | | | | | | | | | | | | | | | | | | | - | 0 |
| M01Ra (32) 12 | F | F | F | F | F | F | | | | | | | | | | | | | | |
| M01Rb (32) 11 | | | | | | | | | | | | | | | | | | | - | 0 |
| M01Rb (32) 12 | F | F | F | F | F | F | | | | | | | | | | | | | | |
| M01Rd (32) 11 | | | | | | | | | | | | | | | | | | | - | 0 |
| M01Rd (32) 12 | F | F | F | F | F | F | | | | | | | | | | | | | | |
| A01Ra (32) 11 | | | | | | | F | F | | | | | | | | | | | - | 4 |
| A01Ra (32) 12 | F | F | F | F | F | F | F | F | | | | | | | | | | | | |
| A01Rb (32) 11 | | | | | | | F | F | | | | | | | | | | | - | 4 |
| A01Rb (32) 12 | F | F | F | F | F | F | F | F | | | | | | | | | | | | |
| LSi (32) 11 | | | I | I | I | I | F | F | | | | | | | | | | | 5 | 8 |
| LSi (32) 12 | | | F | F | I | I | F | F | | | | | | | | | | | | |
| LSb (32) 11 | | | I | I | I | I | F | F | | | | | | | | | | | 5 | 4 |
| LSb (32) 12 | | | F | F | I | I | F | F | | | | | | | | | | | | |
| M0Ra (16) 11 | | | | | | | | | I | I | I | I | F | F | F | F | F | F | 11 | 10 |
| M0Ra (16) 12 | | | | | | | | | F | F | F | F | I | I | I | I | I | I | | |
| M0Rb (16) 11 | | | | | | | | | I | I | I | I | F | F | F | F | F | F | 11 | 10 |
| M0Rb (16) 12 | | | | | | | | | F | F | F | F | I | I | I | I | I | I | | |
| M0Rd (16) 11 | | | | | | | | | I | I | I | I | F | F | F | F | F | F | 11 | 10 |
| M0Rd (16) 12 | | | | | | | | | F | F | F | F | I | I | I | I | I | I | | |
| M1Ra (16) 11 | | | | | | | | | I | I | I | I | F | F | F | F | F | F | 11 | 10 |
| M1Ra (16) 12 | | | | | | | | | F | F | F | F | I | I | I | I | I | I | | |
| M1Rb (16) 11 | | | | | | | | | I | I | I | I | F | F | F | F | F | F | 11 | 10 |
| M1Rb (16) 12 | | | | | | | | | F | F | F | F | I | I | I | I | I | I | | |
| M1Rd (16) 11 | | | | | | | | | I | I | I | I | F | F | F | F | F | F | 11 | 10 |
| M1Rd (16) 12 | | | | | | | | | F | F | F | F | I | I | I | I | I | I | | |
| A0Ra (16) 11 | | | | | | | | | I | I | I | I | F | F | F | F | F | F | 11 | 10 |
| A0Ra (16) 12 | | | | | | | | | F | F | F | F | I | I | I | I | I | I | | |
| A0Rb (16) 11 | | | | | | | | | I | I | I | I | F | F | F | F | F | F | 11 | 10 |
| A0Rb (16) 12 | | | | | | | | | F | F | F | F | I | I | I | I | I | I | | |
| A1Ra (16) 11 | | | | | | | | | I | I | I | I | F | F | F | F | F | F | 11 | 10 |
| A1Ra (16) 12 | | | | | | | | | F | F | F | F | I | I | I | I | I | I | | |
| A1Rb (16) 11 | | | | | | | | | I | I | I | I | F | F | F | F | F | F | 11 | 10 |
| A1Rb (16) 12 | | | | | | | | | F | F | F | F | I | I | I | I | I | I | | |
| | | | | | | | | | | | | | | | | | | | TOTAL | 120 |

SOURCE OPERANDS

DESTINATION OPERANDS

FIG.4

PROCESSOR CONTAINING DATA PATH UNITS WITH FORWARDING PATHS BETWEEN TWO DATA PATH UNITS AND A UNIQUE CONFIGURATION OR REGISTER BLOCKS

RELATED APPLICATIONS

Not Applicable

TECHNICAL FIELD OF THE INVENTION

The present invention generally relates to digital signal processors. More specifically, the present invention relates to data forwarding paths and couplings among register files and functional units in a very long instruction word digital signal processor.

BACKGROUND OF THE INVENTION

Many different types of programming models exist in the area of digital signal processing. In general, these models differ by their characteristics, such as data types, data lengths, data functions, and the like. Instruction parallelism models are one type of model An instruction parallelism model is defined by its ability to simultaneously execute different instructions. Instruction parallelism models can be embodied by a very long instruction word ("VLIW") model or a super-scalar model, among others. VLIW models are advantageous in that they are very scalable, they are not affected by "memory wall" concerns, and they save both silicon area and power consumption by off loading the complex instruction scheduling schemes to a compiler.

VLIW models use a horizontal approach to parallelism where several scalar instructions are included in a long instruction word that is fetched from memory and executed by functional units in every cycle. More specifically, in each cycle, an instruction word specifies operations to be performed using specific data elements or operands. Exemplary operations may include mathematical operations, logical operations, and the like, depending upon the needs of a particular application. A variety of functional units, processing elements, or execution units perform the operations. More specifically, exemplary functional units may include multiply-accumulate ("MAC") units, load/store units, add units, and the like, and may vary from application to application. The data elements or operands are typically stored in register files.

Instructions from a VLIW model are executed by functional units in a digital signal processor ("DSP") . A scheduler may determine which functional units will execute the instructions. These instructions can be scheduled statically, that is, at compile time, as opposed to dynamically, that is, at run time. Because the instructions may be scheduled at the time of compiling under a VLIW model, a processor can simultaneously execute instructions while minimizing the occurrence of hazards.

VLIW architectures typically require processors to have a large number of buses and forwarding paths for delivering information among DSP elements, e.g., register files and functional units. This can be problematic in that it may increase processing time and power consumption. As such, there is a need for modifying the number of buses and the length of connection wires to deliver a faster access time in transporting information while reducing power consumption.

Some previous processors utilize a crossbar switch, i.e., a switch having a plurality of interconnected vertical and horizontal paths, for transferring information. However, these switches are very expensive and consume a considerable amount of power. Other previous architectures utilize a very tight forwarding and sharing scheme for transferring information such that a processor is essentially divided into parts, without permitting forwarding and sharing of information between the parts.

SUMMARY OF THE INVENTION

Accordingly, the present invention provides an architecture in which the number of buses and the length of connection wires is efficiently configured to allow faster access time in transferring information between register files and functional units and in forwarding results between functional units while reducing power consumption via a pre-specified coupling scheme.

The present invention also allows for a specified flexibility while controlling the complexity of the hardware and multiplexing needed between register banks and functional units.

An exemplary embodiment of the present invention may be implemented in one form by a digital signal processor that utilizes functional units to execute instructions. More specifically, a processor includes a plurality of storage elements which are coupled to a plurality of data path units ("DPUs") , wherein each DPU contains a plurality of functional units. Preferably, at least two DPUs are coupled with at least one storage element. In addition, the processor has a plurality of forwarding paths which forward information from one data path unit to another. The processor utilizes a scheduler which may forward instructions to functional units based on the physical coupling of processing elements and on certain restrictions, such as operand sharing restrictions which increase the simplicity and efficiency of the processor.

BRIEF DESCRIPTION OF THE DRAWING

A more complete understanding of the present invention may be derived by referring to the detailed description and claims when considered in connection with the Figures, wherein like reference numbers refer to like items throughout the Figures, and:

FIG. 4 shows a matrix diagram of an exemplary functional unit scheduler; and

DETAILED DESCRIPTION OF THE PREFERRED EMBODIMENTS

In general, a preferred embodiment of the present invention relates to a very long instruction word ("VLIW") digital signal processor ("DSP") having a plurality of storing and processing elements such as register files and functional units which transmit data, instructions and the like, via an efficient configuration of paths. The efficiency is facilitated by a functional unit scheduler or scoreboard unit that issues or forwards instructions to certain functional units based on the configuration of the processor and the availability of the functional units. The functional units utilize operands or data elements from register files to execute the instructions. The functional units then execute the instructions and forward the results, if necessary, as configured and instructed.

The following U.S. patent applications are related to the present invention. More specifically, these patent applications detail, inter alia, exemplary instruction set architectures which provide for different types of instructions and exemplary arrangements of processing elements such as functional units and register files for achieving efficient execution of operations while balancing time, cost and spatial concerns. Therefore, the following U.S. patent applications are hereby incorporated by reference: Reconfigurable Functional Units for Implementing A Hybrid VLIW-SIMD Programming Model by inventor Moataz A. Mohamed, Ser. No. 09/172,315, filed Oct. 14, 1998, and Digital Signal Processor Configuration Including Multiplying Units Coupled To Plural Accumulators For Enhanced Parallel MAC Processing by inventor Moataz A. Mohamed, Ser. No. 09/172,527, filed Oct. 14, 1998, issued as U.S. Pat. No. 6,230,180 on May 8, 2001.

The present invention may be described herein in terms of functional block components and various processing steps. It should be appreciated that such functional blocks may be realized by any number of components configured to perform specified functions. For example, the present invention may employ various integrated circuit components, which may carry out a variety of functions. In addition, those skilled in the art will appreciate that the present invention may be practiced in any number of data processing contexts and that the digital signal processing configuration scheme described herein is merely one exemplary application for the invention. Further, it should be noted that the present invention may employ any number of conventional techniques for data storage, transport, manipulation, processing, and the like. Such general techniques that may be known to those skilled in the art are not described in detail herein.

Figure 1:
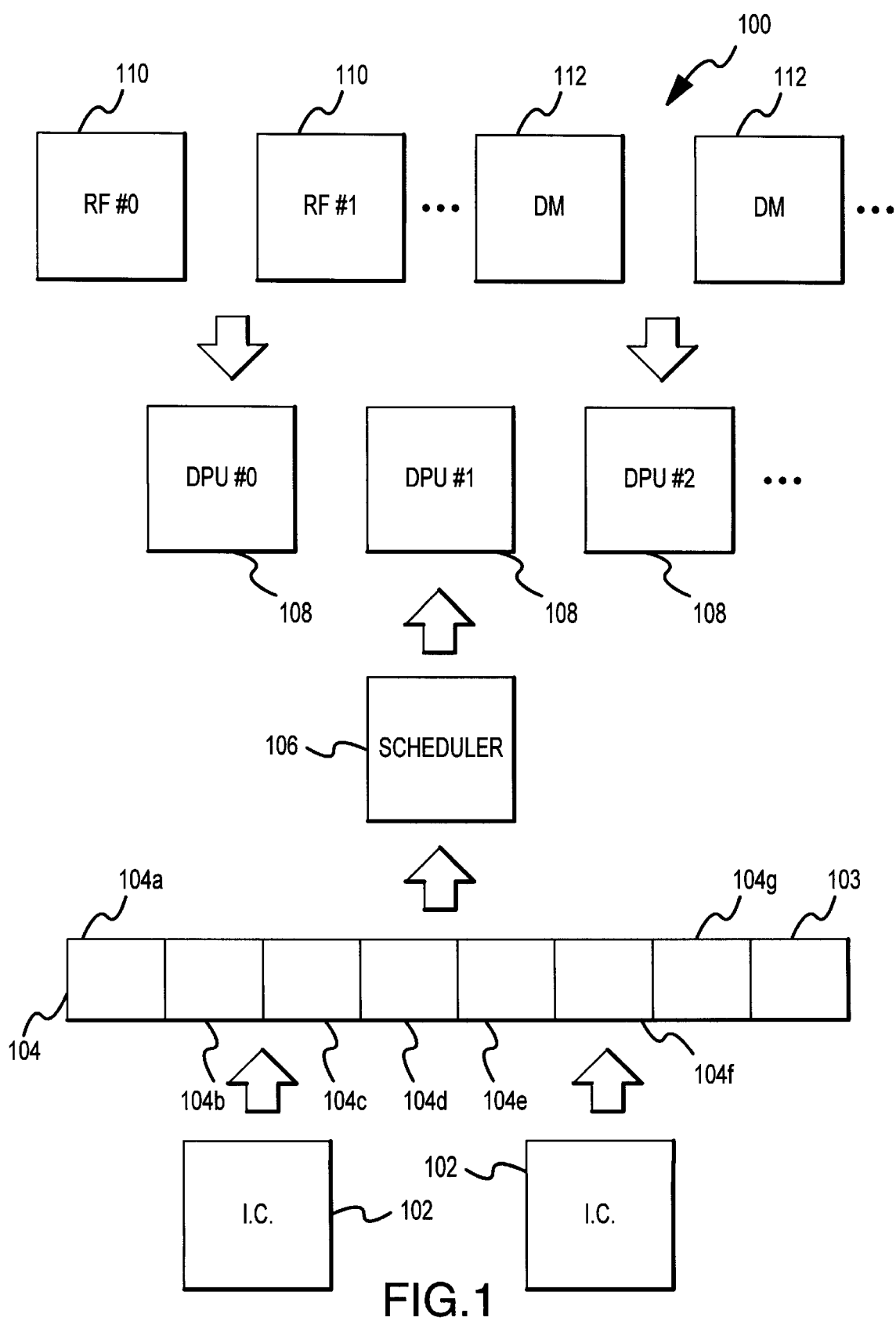
FIG. 1 shows a block diagram of an exemplary digital signal processor.

With reference to FIG. 1, an exemplary VLIW DSP 100 includes an instruction cache 102, an instruction packet 104, a scheduler 106, a plurality of data path units 108, a plurality of register blocks 110, and a plurality of data memory elements 112. Preferably instruction packet 104 is 256 bits wide, although other widths, such as 128 bits, may also be used. Instruction packet 104 includes a plurality of instructions 104a–104g and a header field 103. Instructions 104a–104g of instruction packet 104 each specify at least one operation to be performed using one or more data elements. Instruction packet 104 is transferred, delivered, transmitted, or the like from instruction cache 102 to scheduler 106. Scheduler 106 reads instructions 104a–104g and determines where instructions 104a–104g could be most efficiently executed. DPUs 108 contain a plurality of functional units which execute instructions. The functional units located within DPUs 108 execute operations using data elements which are typically located or stored in storage elements or register blocks 110. DPUs 108 are coupled to register blocks 110 for transferring information between them. Therefore, scheduler 106 determines which functional units should execute instructions 104a–104g in part based on the coupling between DPUs 108 and register blocks 110.

A preferred organization of instruction cache 102 efficiently balances the need for a faster access time and a smaller silicon area. Instruction cache 102 requires a large line size in order to accommodate the long instructions associated with the VLIW model, i.e., a 256-bit instruction packet per line. In a preferred embodiment, the lines may be split into two or more parts, each part having a cache array with a tag array placed between the parts, as is known in the art. In a preferred embodiment, an eight-way set associate cache is used to minimize conflict misses, as is also known in the art. A multi-banked arrangement may be implemented in order to reduce power.

Figure 2:
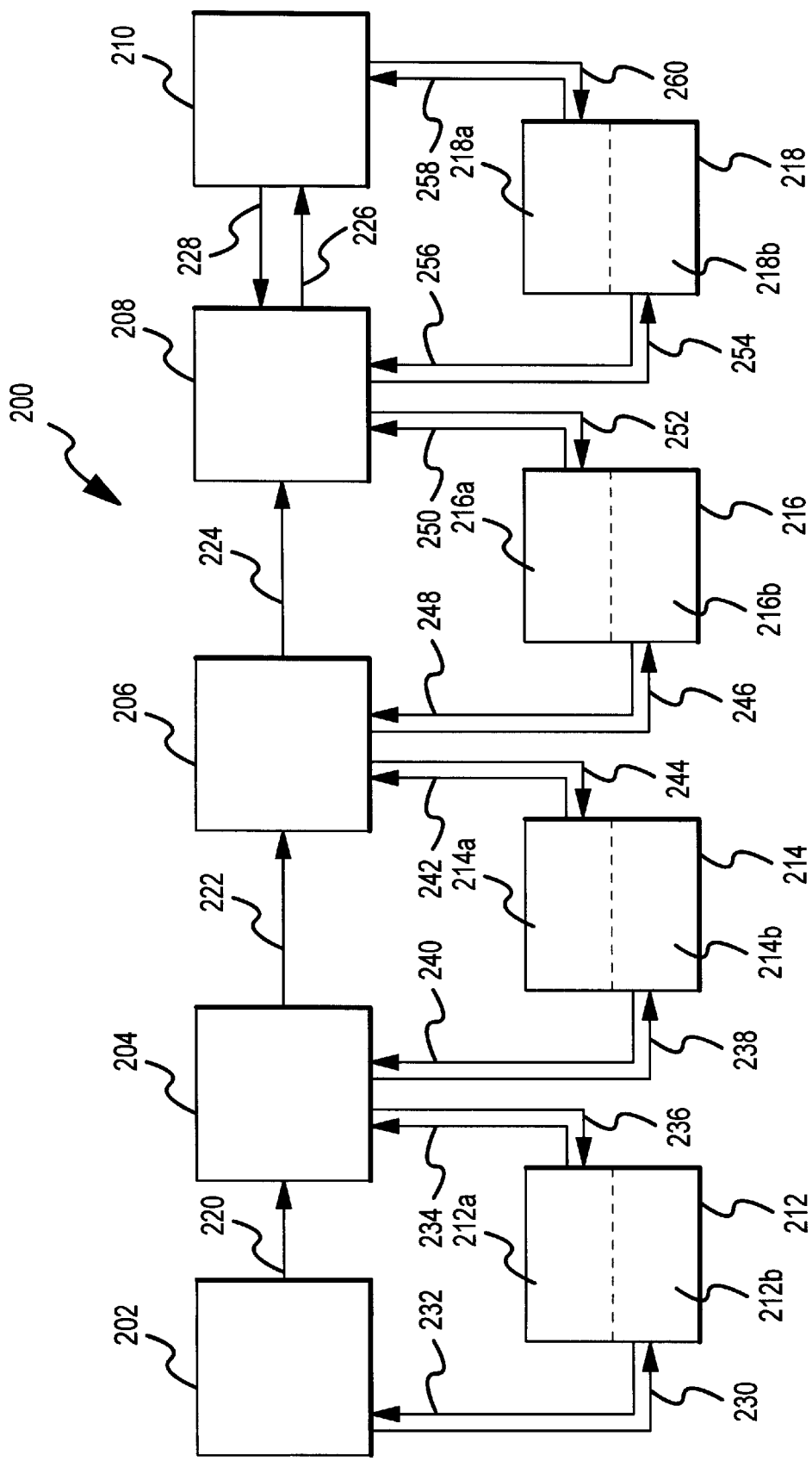
FIG. 2 shows a block diagram of exemplary forwarding and coupling paths.

Scheduler 106 distributes instructions 104a–104g to functional units in part based on the coupling configuration of register blocks 110 and DPUs 108. Referring now to FIG. 2, an exemplary coupling configuration includes a plurality of DPUs 202–210, a plurality of register blocks 212–218 and a plurality of coupling elements, connecting elements, forwarding paths or the like 220–260. Coupling elements may be electrical connections such as buses, conductive wires and the like. This preferred embodiment of the present invention contains five DPUs 202, 204, 206, 208 and 210 and four register blocks 212, 214, 216, and 218, however other quantities of DPUs and register blocks may be used.

Figure 3:
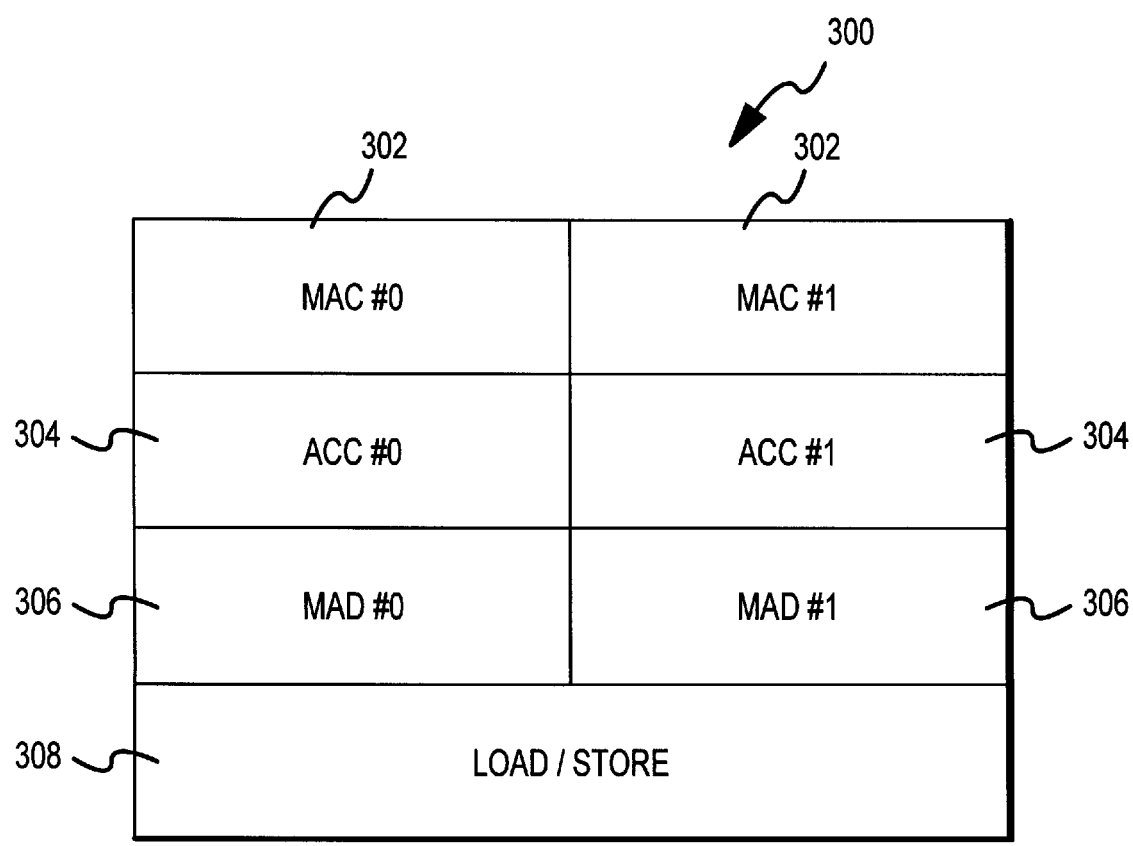
FIG. 3 shows a block diagram of an exemplary data path unit.

DPU 202–210 may contain a variety of different types of functional units. Functional units may include, inter alia, multiply-accumulate ("MAC") units, adders, subtractors, logical shifts, arithmetic shifts and any other mathematical or logical operations. FIG. 3 shows an exemplary DPU 300, which includes a plurality of MAC units 302, a plurality of accumulators 304, a plurality of multiply-add ("MAD") units 306 and a load/store unit 308. Preferably, each MAC unit 302 is a 16×16 bit unit or a 32×32 bit unit, accumulators 304 are 40 bits wide, MAD units 306 are 40 bits wide, load/store unit 308 is 32 bits wide, although other widths may also be used. MAC units 302, accumulators 304, and MAD units 306 may operate in combination with like functional units or processing elements to execute operations of larger bit widths.

Register files store data operands for use by the functional units in executing various operations. Register files may be scalar register files or vector register files. Both the scalar register file and the vector register file may be divided into banks. In other words, a scalar register file may be subdivided into scalar register file banks and a vector register file may be subdivided into vector register file banks. Preferably, each scalar register file is comprised of four banks, where each bank has a plurality of 32-bit registers, a plurality of read ports, and a plurality of write ports. Each vector register file is also preferably comprised of four banks, where each bank has a plurality of 64-bit registers, a plurality of read ports, and a plurality of write ports. One skilled in the art will understand that other bank configurations, dimensions, and number of ports may also be used.

With reference to FIG. 2, in an exemplary embodiment of the present invention, scalar register file is subdivided into four scalar register file banks 212a–218a. Vector register file is subdivided into four vector register file banks 212b–218b. In addition, in a preferred embodiment, scalar register file banks can be physically grouped, coupled, or associated with vector register file banks. Each register block 212, 214, 216 and 218 preferably includes both scalar register file bank 212a, 214a, 216a, and 218a and vector register file bank 212b, 214b, 216b, and 218b respectively.

FIG. 2 also depicts a preferred exemplary forwarding configuration, where DPU#n may forward information or data, e.g., execution results, to DPU#n+1. More particularly, with reference to FIG. 2, DPU#0 202 may forward results to DPU#1 204 along path 220, DPU#1 204 may forward results to DPU#2 206 along path 222, DPU#2 206 may forward results to DPU#3 208 along path 224 and DPU#3 208 may forward results to DPU#4 210 along path 226. In addition, because DPU#4 210 is the last DPU in this chain and no additional DPUs follow it, DPU#4 210 may forward its results back to DPU#3 208 along path 228. This configuration enables more than one DPU to utilize a result from a functional unit in another DPU and thereby increases the flexibility of the processor.

In this exemplary embodiment forwarding occurs between only two DPUs and not among several DPUs. In other words, DPU#0 202 may forward to DPU#1 204 only and may not forward to DPU#2 206, DPU#3 208 or DPU#4 210. Similarly, DPU #2 206 may forward to DPU#3 208 and may not forward to DPU#0 202, DPU#1 204 or DPU#4 210. In addition, forwarding may only occur in one direction. In other words, DPU#1 204 may forward to DPU#2 206, but DPU#2 206 may not forward results back to DPU#1 204. However, the last DPU in the chain, DPU#4 210 may forward results back to one of the other DPUs, preferably the DPU immediately preceding it, namely DPU#3 208, so that it has somewhere to forward its results.

Register blocks ("RBs") 212–218 may be coupled with, associated with, or related to DPUs 202–210 in a preferred configuration. RB#m is associated with DPU#m and DPU#m+1. More specifically, a preferred forwarding configuration exists as follows: RB#0 212 may send data to DPU#0 202 over path 232 or receive data from DPU#0 202 over path 230; RB#0 212 may also send data to DPU#1 204 over path 234 or receive data from DPU#1 204 over path 236; RB#1 214 may send data to DPU#1 204 over path 240 or receive data from DPU#1 204 over path 238; RB#1 214 may also send data to DPU#2 206 over path 242 or receive data from DPU#2 206 over path 244; RB#2 216 may send data to DPU#2 206 over path 248 or receive data from DPU#2 206 over path 246; RB#2 216 may also send data to DPU#3 208 over path 250 or receive data from DPU#3 208 over path 252; RB#3 218 may send data to DPU#3 208 over path 256 or receive data from DPU#3 208 over path 254; and RB#3 218 may also send data to DPU#4 210 over path 258 or receive data from DPU#4 210 over path 260. This configuration enables more than one set of functional units to execute operations of a given instruction which utilizes data from a specific RB.

In summary, a preferred exemplary forwarding scheme permits each RB to access two or more DPUs and allows each DPU to receive data from two or more RBs. Moreover, this forwarding scheme permits DPUs to share or forward execution results to other DPUs. It will be appreciated that the above forwarding or coupling configurations are exemplary and that other configurations may be utilized. Such other configurations may increase processing time, physical space requirements, and/or cost in that such a DSP may need more and/or longer connections. In addition, such other configurations may use fewer connections, thereby decreasing the flexibility of the present embodiment.

Scheduler 106 may utilize the exemplary forwarding configuration. Instructions typically identify what operation should be performed with what data. After scheduler 106 receives an instruction, it may then determine which RB contains the identified data and which DPUs are coupled to this RB. Scheduler 106 may then forward the instruction to one of the identified DPUs to execute the instruction. For example, an exemplary instruction 102a may be received by scheduler 106:

ADD SR1 SR2 SR3

Assume, for example, that SR1, SR2, and SR3 are all located in RB#0 212 of FIG. 2 and DPU#0 202 and DPU#1 204 both contain ADD units. Scheduler 106 preferably contains all of the coupling information regarding the coupling configuration of the exemplary processor and may identify that DPU#0 202 and DPU#1 204 are coupled to RB#0 212 and contain ALUs to perform an add operation. Scheduler 106 may send instruction 102a to either DPU#0 202 or DPUG#1 204 because both DPUs are coupled with RB#0 212. In addition, scheduler 106 may contain information stating that DPU#2 206, DPU#3 208, and DPU#4 210 are not coupled with RB#0 212 and thus scheduler 106 may not send instruction 102a to any of these DPUs because they will not be able to obtain the necessary data in SR1, SR2, and SR3 of RB#0 212. The forwarding scheme is essentially invisible to the programmer since the programmer only knows that an instruction which uses RB#0 212 may get scheduled for execution by the hardware to either DPU#0 or DPU#1.

Referring now to FIG. 4, in an exemplary embodiment of the present invention, a hardware scheduler or scoreboard unit 400 charts source operands against destination operands and contains information on valid forwarding paths (identified as "F") and invalid forwarding paths (identified as "I") as described herein. Scheduler 400 may be configured to facilitate hardware simplicity and efficiency via a minimum number of comparators in connection with certain restrictions. Scheduler 400 may include a minimum number of comparators to reduce the power consumption and to reduce logic complexity in order to achieve a desired cycle time. In addition, scheduler 400 may include operand sharing restrictions. This scheduling scheme increases the efficiency of a DSP's pipeline by minimizing or avoiding unnecessary stalls and hazards.

More specifically, the above restrictions may include limiting the number of instructions which can receive execution results from other instructions. Other restrictions may include limiting the number of functional units that can receive certain data, as described above. Such restrictions facilitate completing instructions which utilize a forwarded result a single cycle which provides for better performance of the DSP. For example, in a preferred embodiment of the present invention, scheduler 400 may maintain information only at a limited or specified number of times or cycles, e.g., at T1 and T2, where T1 could be a first cycle and is a current cycle plus one and T2 could be a second cycle and is the current cycle plus two. As described above, scheduler 400 may then forward instructions to functional units in an efficient manner based on this information. This restriction imposed on scheduler 400 limits the number of instructions to which results can be forwarded.

Scheduler 400 preferably monitors which DPUs and more particularly, which functional units, are associated with each RB so that an instruction may be forwarded to the most appropriate functional unit. For determining a suitable forwarding scheme, scheduler 400 also contains restriction information, as discussed above, and information about how results may be forwarded to subsequent instructions in the event that results need to be utilized soon after they are calculated by the same or nearby DPUs. Consider the following example. Instruction X and Instruction Y are two consecutive instructions within Instruction Packet Z. DSP A contains multiple DPUs, where DPU#1 may forward its results to DPU#2. (Scheduler 400 might contain an "F" for such a connection indicating this forwarding path.) Instruction X, when executed will yield a result, R, and Instruction Y requires the use of result R. Scheduler 400 may schedule Instruction X to be executed in DPU#1 so that result R can next be used in DPU#1 or DPU#2. Scheduler 400 may then schedule Instruction Y to be executed in DPU#1 or DPU#2 so that result R will be accessible for execution. In this example, Instruction X may be referred to as a producer instruction because it is an instruction which will produce a result and Instruction Y may be referred to as a consumer instruction because it is an instruction which will consume or use the result of a producer instruction. Scheduler 400 selects which DPUs should execute producer instructions and consumer instructions based on the consumer instruction's need for the producer instruction's result.

Scheduler 400 may contain different forwarding rules or restrictions as discussed above. In particular, scheduler 400 may contain different forwarding rules for those consumer instructions which are one instruction away from a producer instruction and for those consumer instructions which are two instructions away from a producer instruction. For example, an exemplary embodiment of the present invention may be configured to efficiently handle multi-cycle instructions, such as MAC instructions. In this context, an exemplary restriction may limit the forwarding of the result of a producer instruction only to a consumer instruction which appears two cycles after the MAC instruction. In other words, assume a MAC instruction is executed at a time, T_MAC. A programming restriction may exist such that another instruction may first use the result from the MAC execution only two cycles after the MAC execution occurs, that is, at a time, T_MAC +2. Otherwise, the next time an instruction can use the MAC result is four cycles after the MAC execution, at time T_MAC +4.

For single cycle instructions, e.g., ALU instructions and load/store instructions, an exemplary restriction may limit the forwarding of a result from a producer instruction to a consumer instruction only to the next immediate instruction packet. For example, assume an add instruction is executed at a time, T_ADD. Given the exemplary programming restriction, an instruction may first use the result of the ADD execution during the next cycle, that is, at time T_ADD+1. If the ADD result is not forwarded immediately during the next cycle, then it may next be used in an instruction packet which is three cycles from the ADD execution, that is, at time T_ADD+3.

Figure 5:
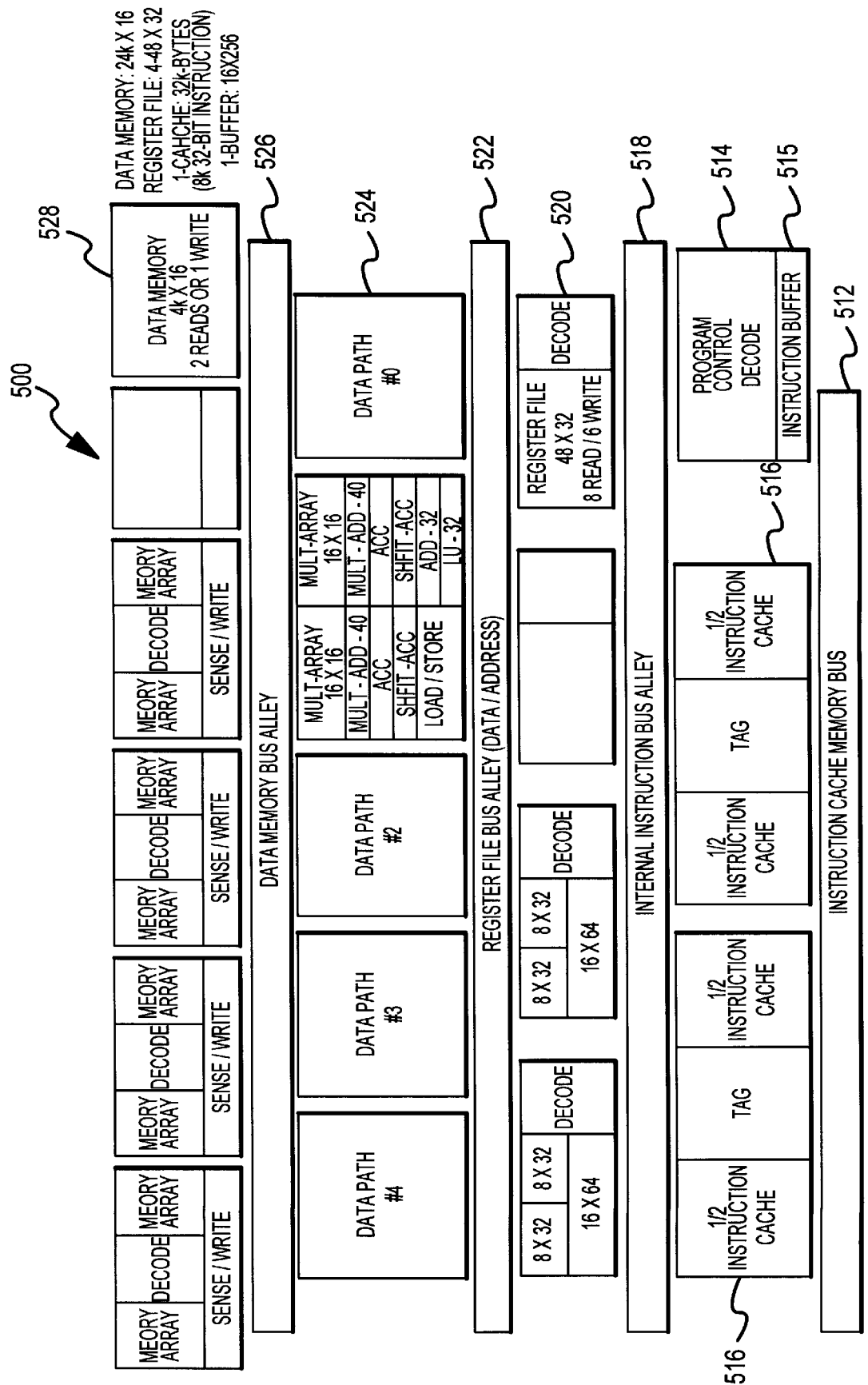
FIG. 5 shows a block diagram of an exemplary physical floor plan of the present invention.

FIG. 5 depicts an exemplary physical floor plan or layout 500 of a preferred embodiment of the present invention. Floor plan 500 includes a program control element 514 having an instruction buffer 515, a plurality of instruction cache memory banks 516, an instruction cache memory bus 512, an internal instruction bus 518, a plurality of RBs 520, a register file bus 522, a plurality of DPUs 524, a plurality of data memory blocks 528 and a data memory bus 526. In a 0.25 um DSP, floor plan 500 preferably fits in a 7.8 mm×7 mm area without a pad ring. If a pad ring stays at 1 mm on each side, a die of 8 mm×8 mm (70.4 sq. mm.) could be used. Permitting for some tolerance, an 80 sq. mm. die could be used which is very competitive in terms of the cost per performance.

FIG. 5 displays a DSP in which the number of buses and the length of the connection wires is efficiently configured to allow faster access time in retrieving and storing data in the register files and in forwarding results between functional units, while reducing power consumption via a pre-specified coupling scheme.

It will be understood that the foregoing description is of preferred exemplary embodiments of this invention and that this invention is not so limited. Various modifications may be made in the design, arrangement, and implementation of this method and apparatus without departing from the spirit and scope of the subject invention, as set forth in the claims below.

What is claimed is:

1. A digital signal processor for use in executing a plurality of instructions contained in an instruction packet, said processor comprising:

a plurality of register blocks, each containing operands;

a plurality of data path units, wherein each of said data path units comprises a plurality of functional units, for executing said instructions using said operands and yielding results;

a coupling fabric configured to facilitate communication between said register blocks and said data path units, wherein said coupling fabric comprises a plurality of forwarding paths wherein each of said forwarding paths is configured to couple two of said data path units together, said forwarding paths being unidirectional; and a scheduler which contains information regarding said coupling fabric, said scheduler configured to forward each of said plurality of instructions to one of said data path units based on the configuration of said coupling fabric; and wherein said plurality of data path units equals M data path units, wherein said coupling fabric is further configured to couple each of said register blocks to L of said M data path units, where 1<L<M.

2. The processor of claim 1, wherein said coupling fabric further comprises a reverse forwarding path between one of said two coupled data path units, said reverse forwarding path being unidirectional.

3. The processor of claim 1, wherein said scheduler includes one or more restrictions which limit the number of said instructions which can utilize said operands and said results.

4. The processor of claim 3, wherein one of said restrictions governs information available to said scheduler to include first information of a first cycle and second information of a second cycle, and wherein said scheduler forwards said instructions to said data path units based on said coupling fabric, said first information and said second information.

5. The processor of claim 1, wherein L=2.

6. The processor of claim 1, wherein said register blocks comprise multi-banked vector register files and multi-banked scalar register files.

7. A method of efficiently scheduling instructions in a very long instruction word digital signal processor having a plurality of data path units, each data path unit comprising a plurality of functional units, a plurality of register blocks having data operands and a coupling fabric configured to facilitate communication between said register blocks and said data path units, wherein said coupling fabric comprises a forwarding path configured to couple two of said data path units together and register blocks being coupled to fewer than all of said data path units, said method comprising the steps of:

receiving an instruction referencing said data operands that, upon execution, yields a result;

determining in a scheduler which of said data path units are capable of executing said instruction based on said coupling fabric and further based on one or more restrictions imposed by said scheduler;

selecting which of said capable data path units would be efficient for executing said instruction; and forwarding said instruction to said selected data path unit for execution by said selected data path unit using said data operands.

8. The method of claim 7, wherein said register blocks comprise multi-banked vector register files and multi-banked scalar register files.

9. The method of claim 7, wherein one of said restrictions governs information available to said scheduler to include first information of a first cycle and second information of a second cycle.

10. The method of claim 7, wherein said plurality of data path units equals M data path units, wherein said coupling fabric is further configured to couple each of said register blocks to L of said M data path units, where 1<L<M.

11. The method of claim 10, wherein L=2.

12. A signal processing system for use in executing the instructions of a very long instruction word architecture, said system comprising:

register blocks configured to store data;

data path units comprising functional units which execute said instructions using said data;

a fabric configured to route data and instructions, said fabric linking said register blocks and said data path units, wherein each of said register blocks is linked to at least two of said data path units, but fewer than all of said data path units, and wherein at least one of said data path units is linked to another of said data path units;

a scheduler for scheduling instructions to said data path units, said scheduler configured to maintain information about said fabric, said register blocks, and said data path units; and a selector for selecting which of said data path units is to execute an instruction.

13. The system of claim 12, wherein said register blocks comprise multi-banked vector register files and multi-banked scalar register files.

14. The system of claim 12, said fabric being further configured such that a first of said data path units may only forward data to a second of said data path units.

15. The system of claim 12, said fabric being further configured such that a first of said data path units and second of said data path units may only forward data to each other.

16. The system of claim 12, said scheduler comprising a restriction controlling when instructions and other data may be forwarded.

17. A digital signal processor for use in executing instructions of a very long instruction word model, said processor comprising:

N register blocks configured to store data;

M data path units, each of said M data path units comprising functional units for executing instructions using said data; and a fabric configured to couple each of said N register blocks to L of said M data path units, where 1<L<M, to enable said data to be exchanged between said N register blocks and said M data path units, said fabric further configured to couple two of said M data path units together to enable said data to be exchanged between said two data path units; and a scheduling mechanism to schedule instructions to said data path units, said mechanism including information about said N register blocks, said M data path units and said fabric.

18. The processor of claim 17, wherein each of said M data path units are associated with a numerical indexing scheme, and wherein said coupling fabric is further configured to couple each of a first of said M data path units and a last of said M data path units with only one of said N storage elements.

19. The processor of claim 18, wherein said first data path unit and said second data path unit are coupled to different ones of said storage elements.

20. The processor of claim 17, wherein said coupling fabric comprises a plurality of forwarding paths, each of said forwarding paths configured to couple two of said data path units together.

21. The processor of claim 20, wherein said coupling fabric further comprises a reverse forwarding path between one of said two coupled data path units.

22. The processor of claim 17, wherein L=2.

23. The processor of claim 17, wherein said N register blocks each comprise multi-banked vector register files and multi-banked scalar register files.

24. A method of executing instructions in a digital signal processor using a very long instruction word architecture, wherein said processor comprises a memory unit, data path units, register blocks and a coupling fabric configured to facilitate communication between said register blocks and said data path units, and between said data path units, each of said register blocks being coupled to fewer than all of said data path units, said method comprising the steps of:

receiving at a scheduler, a first instruction from said memory unit;

determining, in said scheduler, which of said data path units are capable of executing said first instruction based on said coupling fabric;

selecting one of said data path units for executing said first instruction based on results of said determining step;

forwarding said first instruction from said scheduler to said one data path unit;

executing said first instruction in said one data path unit, producing a result; and storing said result from said executing step in one of said register blocks coupled to said one data path unit.

25. The method of claim 24, wherein said register blocks comprise multi-banked vector register files and multi-banked scalar register files.

26. The method of claim 24, in which said executing step yields a result which is forwarded from said one data path unit to a second of said data path units.

27. The method of claim 24, wherein said determining step is responsive to restrictions imposed upon said scheduler.

28. The method of claim 27, in which said executing step yields a result which is forwarded from said one data path unit to a second of said data path units at a time determined by said restrictions.

* * * * *